Jan. 2, 1940.  W. H. HARRISON ET AL  2,185,847
PHOTOGRAPHIC APPARATUS AND METHOD
Filed April 13, 1936  2 Sheets-Sheet 1
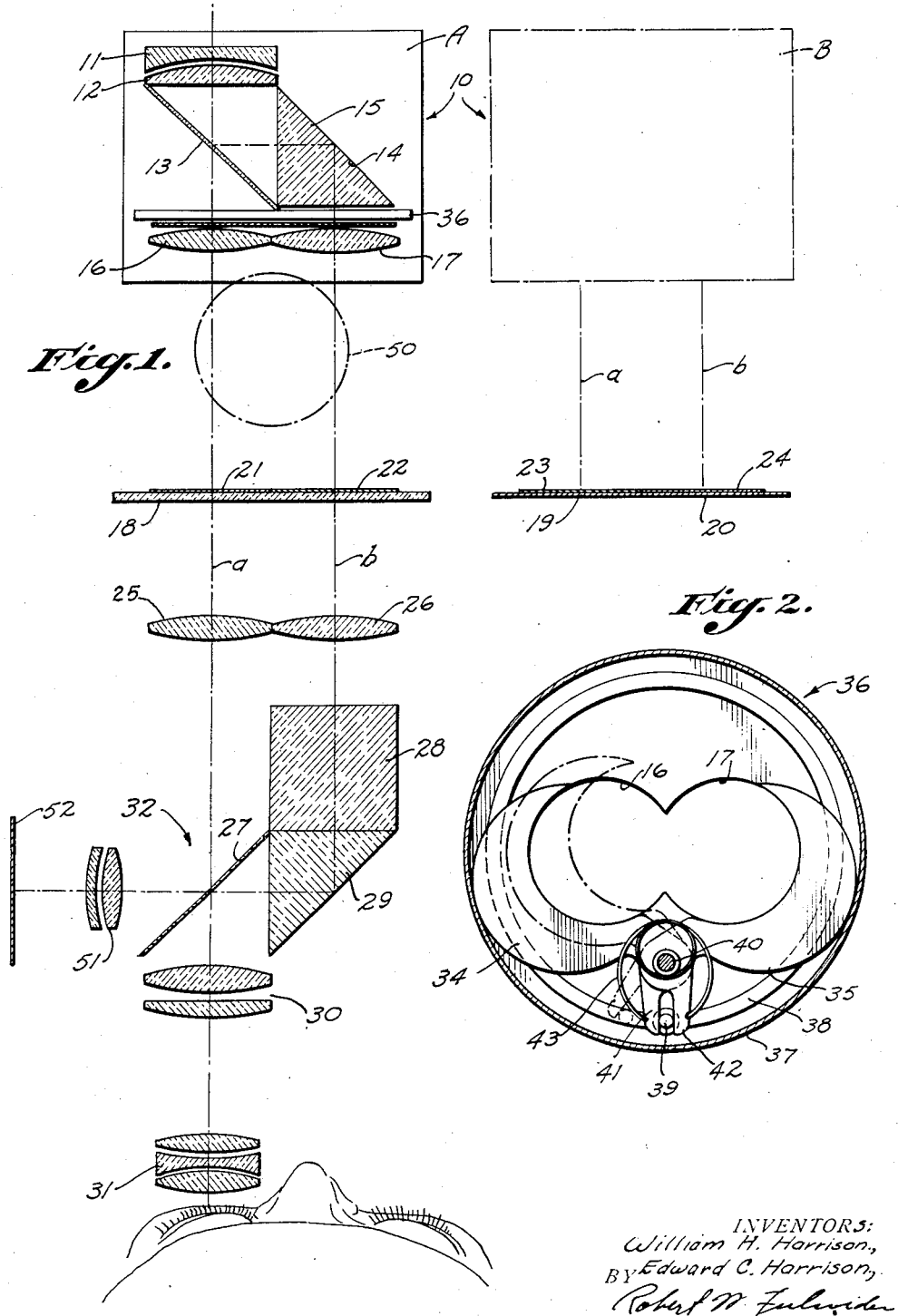

Jan. 2, 1940.  W. H. HARRISON ET AL  2,185,847
PHOTOGRAPHIC APPARATUS AND METHOD
Filed April 13, 1936    2 Sheets-Sheet 2
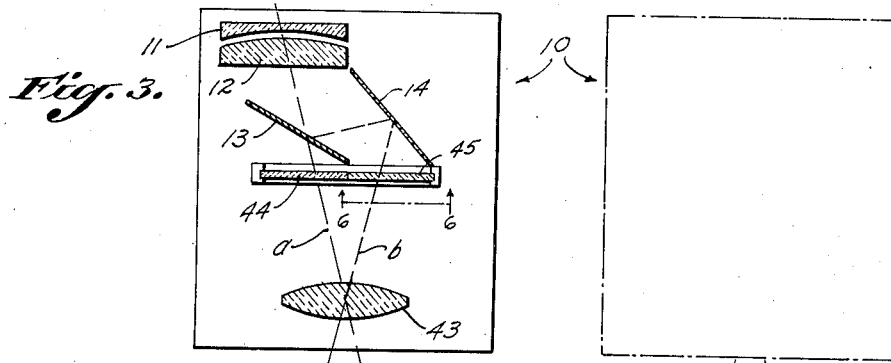
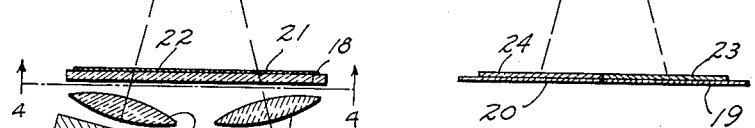
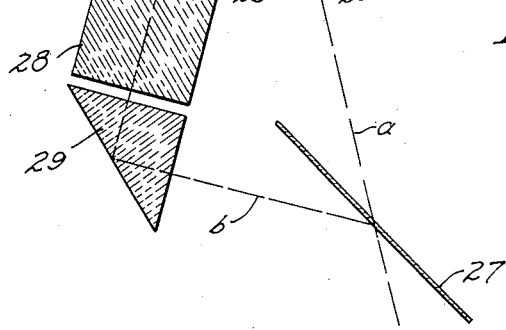
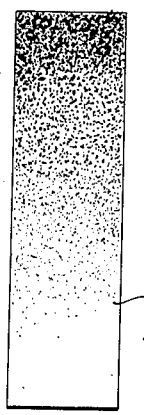
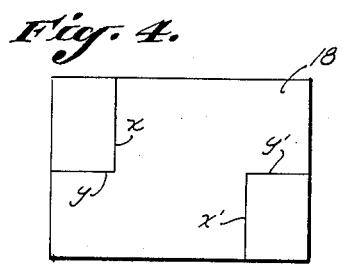
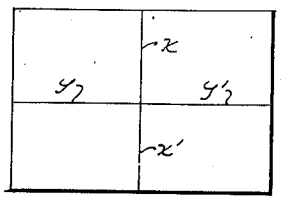
INVENTORS:
William H. Harrison,
Edward C. Harrison,
BY Robert M. Fulwider
ATTORNEYS.

Patented Jan. 2, 1940

2,185,847

UNITED STATES PATENT OFFICE 2,185,847

PHOTOGRAPHIC APPARATUS AND METHOD

William H. Harrison and Edward C. Harrison, Los Angeles, Calif.; Dolly V. Harrison, owner of the entire right of said Edward C. Harrison, deceased, by decree of court, assignors, by mesne assignments, to Dunningcolor Corporation, Los Angeles, Calif., a corporation of California Application April 13, 1936, Serial No. 74,032

7 Claims. (Cl. 95—2)

Our invention relates broadly to color photography and more particularly to systems of color photography wherein a plurality of color value images of the same field are simultaneously recorded on separate films or areas of the same film. Our invention is especially useful in motion picture work where the camera is provided with a beam splitting device for securing the various part images on adjacent areas of light sensitive film. By a slight modification of our apparatus it can also be utilized in printing operations.

In all photographic work it is of course necessary to provide a finder on the camera so that the operator can see exactly what is being photograped. In color photography, it becomes important for the operator to see not only that his camera is in focus and directed on the proper subject matter, but also to see that the proper color balance is being recorded in the respective images, and to have easily operated means for regulating the color balance of the exposures.

The major object of our invention is to provide a simple and efficient method and means for attaining the foregoing advantages.

It is also an object of our invention to provide novel means for varying the intensity and quantity of light used in securing the individual part images.

It is a further object of our invention to provide a novel optical system which includes auxiliary lens means, in combination with simple and effective light splitting means of a novel character.

Other more specific objects and advantages will become readily apparent from the following description of preferred forms of our invention and from an inspection of the accompanying drawings in which:

Fig. 1 shows diagrammatically one form of camera embodying a finder made in accordance with our invention.

Fig. 2 is a front elevation of the double iris mechanism which may be employed in the camera type of Fig. 1.

Fig. 3 shows diagrammatically a modified form of camera and finder embodying a novel type of beam splitter.

Fig. 4 shows the finder ground glass in detail.

Fig. 5 shows how the ground glass appears through the eyepiece when the finder is in adjustment.

Fig. 6 illustrates a suitable form of filter wedge which may be used in conjunction with our invention.

Referring now to the drawings and particularly to Fig. 1 thereof, the numeral 11 indicates a lens movable to and away from a second lens 12 held in fixed position. Directly in back of the lenses 11 and 12 is a light splitting means which may conveniently comprise a semi-reflective, semi-transparent surface 13 and a full reflective surface 14 substantially parallel thereto, which may be formed by silvering or otherwise suitably treating the hypotenuse of a right angled prism 15. It will be understood of course that numerous combinations of reflective and semi-reflective surfaces may be used, although it is highly preferable that the two part beams indicated by the letters $a$ and $b$ emerge from the same side of the light splitter as illustrated in Fig. 1. Two objective lenses 16 and 17 are disposed directly behind the beam splitter and in the paths of beams $a$ and $b$, said lenses being adapted to focus their respective beams $a$ and $b$, on a ground glass or other suitable diffusion screen 18. This assembly of auxiliary lenses 11 and 12, beam splitting surfaces 13 and 14 and objective lenses 16 and 17 will be hereinafter referred to collectively as the light splitting portion 10 of the finder. Substantially complementary filters 21 and 22 (for example red and green) are placed against the ground glass 18 in the beam paths $a$ and $b$ respectively so that the two images thrown on the ground glass will be of substantially complementary colors.

While the exact focus of objective lenses 16 and 17 may of course be varied according to circumstances, we have found it advisable to focus them on infinity for ordinary work and conditions, and when this is the case the auxiliary lenses 11 and 12 are preferably plano-concave and plano-convex respectively as illustrated. Broadly stated the characteristics of the auxiliary lenses are always such that the residual power of their combination when the lenses are separated compensates for the difference between the distance of the field from the objective lenses, and the distance of their permanent focus, this latter distance as mentioned being infinity in the form illustrated. Obviously with the objective lenses locked at a permanent focus, usually for a greater distance than the ordinary object being photographed, it becomes necessary to provide the compensating lenses 11 and 12. When the latter lenses are in contact, their total effect is nil (in the preferred form shown) and as the outer lens is moved farther away from the fixed lens, their residual power increases giving a varying compensation for varying distances of the field from the objective lenses.

It has heretofore been common practice in beam splitting optical systems to attempt to focus by moving the objective lenses, which method has two very serious disadvantages neither of which are encountered when the objective lenses and beam splitter are retained in locked position and the auxiliary compensating lenses of our invention are employed. In the first place in order to move the objective lenses it is essential that the beams $a$ and $b$ be absolutely parallel at all times or else the center distance of the images on the ground glass or film will be varied, which of course is fatal if adjacent areas of a single film are being used, and is highly impractical if separate films are being used for recording. Secondly, in the movement of the lenses 16 and 17 absolute accuracy of adjustment would be necessary, for their slightest lateral movement would cause relative displacement of the images produced by the lenses, which would make it utterly impossible to later register them in printing. To perfect such a mechanism which would withstand ordinary wear and tear would be well nigh impossible.

Field lenses 25 and 26 are disposed in the beam paths $a$ and $b$ somewhat behind the ground glass 18 and a semi-reflective surface 27 is placed in the light path $a$ behind the lens 25. A glass plate 28 of suitable thickness and a right angled prism 29 are disposed in the light path $b$, the hypotenuse of the prism 29 being made reflecting so as to recombine beam $b$ with beam $a$ on the semi-reflecting, semi-transmitting surface 27. The plate 28 provides a convenient means for compensating for the difference in length of the optical paths $a$ and $b$, and the prism 29 will be recognized as one satisfactory means of providing a reflective surface for the beam $b$. The plate 28 is pivotally mounted so as to compensate for center distance variation as hereinafter explained. An objective lens 30 and an eyepiece 31 are provided in the path of the recombined beams $a$ and $b$, emerging from surface 27. The assembly of lenses 25 and 26, reflecting surfaces 27 and 29, plate 28, lenses 30 and eyepiece 31 will for brevity be hereinafter referred to as the beam recombining portion 32 of the finder.

As shown in Fig. 4, the ground glass 18 is provided with a pair of laterally displaced vertical lines $x$—$x'$ and a pair of rectilinear spaced horizontal lines $y$—$y'$. The lines $x$ and $y$ are in the beam path $a$, and the lines $x'$ and $y'$ are in the beam path $b$, the distance between lines $x$ and $x'$ being exactly equal to the center distance of the lenses 16 and 17.

As will be evident to those skilled in the art, the finder is directed toward the object to be photographed and lens 11 is adjusted so that the light beams $a$ and $b$ are focused on ground glass 18 to produce complementary colored images, for example red and green on adjacent portions thereof. The recombining means 32 of the finder is focused on the ground glass and when the glass is viewed with the eyepiece 31, two superposed separately colored images are seen as combined to make one composite correctly colored image. If the center distance of the beam recombining means is correct, the lines $x$—$x'$, and $y$—$y'$ will meet and form a cross as seen in Fig. 5, but if the center distance of the recombining means is not correct, there will be a break in lines $x$—$x'$, and lines $y$—$y'$ will be displaced vertically with respect to each other. If this latter condition obtains, the plate 28 is rotated about its axis perpendicular to the plane of the light paths $a$ and $b$ until the image beam $b$ is displaced enough to be exactly superposed with image $a$ on surface 27 and the lines $x$—$x'$ and $y$—$y'$ form the cross of Fig. 5. If the image of the field is still out of register after the cross is obtained, i. e. after the finder center-distance has been corrected, then it will be known that the light splitting part 10 of the optical system is out, and it can be readjusted before any film is wasted in photographing out of register. This feature of being able to insure correct center distance in the optical system is of paramount importance in commercial work where various films photographed at different times and possibly with different cameras must be intercut into one continuous reel for printing.

In many motion picture cameras as now used, the camera box containing the shutter and film feeding mechanism is movable laterally with respect to the photographic optical system, and where a light splitting system is to be used in photographing which is similar to the one employed in the finder, the assembly 10 of the finder can be omitted and the light splitting optical system of the camera used for both the finder and photographing. In this case the ground glass 18 is disposed in the same plane as the film to be photographed, and the lenses are focused thereon as before. The finder center distance is adjusted as previously described and the images properly focused on the ground glass. The ground glass is then racked out of position and a film or films having adjacent areas 19 and 20 is moved over to the position formerly occupied by ground glass 18. The film gate is provided with complementary filters 23 and 24 correlated with ground glass filters 21 and 22 respectively, and when the camera shutter is opened, the beams $a$ and $b$ will form complementary images of the given field on film portions 19 and 20, through the filters 23 and 24.

By first splitting up the light coming from the object to be photographed and passing the component beams through the filters 21 and 22 separate colored images are formed on the ground glass 18 which are equivalent to the images which will be photographed on the film portions 19 and 20 through their respective filters 23 and 24. By focusing the beam recombining means 32 on these colored images the camera operator is enabled to see a composite image in color which is the equivalent of the composite image which will be later formed by recombining the part images obtained by exposure on the film portions 19 and 20 and he is thus enabled to ascertain two important factors in advance of the exposure; first, whether or not the photographing lenses are in proper adjustment, and second, whether his color balance is correct to give a true colored image upon recombining the part images obtained in photographing.

In order that the image which the camera operator sees in the finder shall be the equivalent of the image to be subsequently reproduced on film, it is of course essential that the images of the finder as seen by the eye be properly correlated with the images produced on the film. The first essential is that substantially complementary filters be chosen which have the proper spectral ranges and give accurate color separation for the process being used. The next essential is that proper exposure be given to the two film areas at all times and under all conditions so that the resulting part images of neutral objects will be of substantially equal density. It is well known of course that various films have different sensitivity ranges and responsiveness and it is therefore necessary that the amount of light reaching the respective film areas be such as to compensate for these differences and always give equal exposures of the film areas, even though the amounts of light necessary to obtain this result will give an image of an incorrect color when combined visually.

According to the method of our invention we attain this balance or correlation as follows. A neutral object such, for instance, as a white wall or screen is illuminated with a constant light and consecutive exposures are made of it through the beam splitting system 10 with varying quantities of light, these variations being accomplished either by changing the density of the filters before the film, varying the aperture size of the lenses or varying the relative transmission and reflection characteristics of the surface 13. The several exposures thus made are developed and fixed and the densities compared, this process being continued until a setting is found which gives equal densities on the image areas 19 and 20 with sufficiently high total light on both image areas. This combination or setting of beam splitter surface, filters and aperture size is then taken as the standard to which the finder is to be correlated.

Substantially the same procedure of trial and error is followed in standardizing the finder except that the recording is on the eye instead of film, that is, the finder is trained on the neutral wall under the same lighting conditions as before and the transmission of the semi-reflective surface 27 or the filters 20 and 21 is varied until the wall appears in its correct color or shade in the eyepiece of the finder. When this setting is found, it is then taken as the correlated standard for the finder, with respect to the recording film.

Once this correlation or balance has been established between the images seen by the eye and the same images recorded by the film for a given set of lighting conditions, it becomes a simple matter to establish correct color balance for all lighting conditions. In each case the operator by first looking through the finder can tell whether there is a surplus or deficiency of a certain kind of light to produce correct results in the exposed film, for if the image as seen in the finder is for example too red, he knows that an excess of red light will strike the film and cause an uneven exposure of the two areas. It is of course well known that different kinds of light have different spectral compositions, and that daylight for instance varies in its spectral composition depending upon the time of day and the atmospheric conditions, and it therefore becomes necessary not only to be able to check the composition of the photographing light but also to be able to compensate for any variation thereof from the standard used in standardizing the photographic and finder optical systems, and it is likewise necessary that the means of accomplishing this compensation be simple and easily operated by the camera operator, without the necessity of restandardizing or correlating the optical systems. As will be seen best from Fig. 2, we have provided a very simple and efficient means for accomplishing this regulation of the amount of light in the respective beams a and b to compensate for such variations in lighting conditions.

Between the light splitting means comprising surfaces 13 and 14 and the objective lenses 16 and 17, we provide a pair of adjustable apertures or irises 34 and 35 adapted to stop down the apertures of lenses 16 and 17 respectively.

These two irises may be conveniently mounted in a single annular housing or ring 36 whose outside tubular wall or ring 37 is provided with an inner ring 38 fastened thereto which carries a pin 39 whose function will be discussed shortly. Each iris is formed with a crescent shaped closure surface of such proportions as to substantially cover its respective lens when in closed position and to fully uncover its lens when in retracted position. The irises 34 and 35 are pivotally mounted on a pin 40, the iris 34 having an arm 41 which extends down along one side of pin 39, and the iris 35 having a like arm 42 which extends down along the other side of pin 39.

As will be apparent from Fig. 2 movement of the rings 37 and 38 and the pin 39 in a clockwise direction causes the arm 41 to likewise move clockwise which rotates the iris 34 about pin 40 to stop down the lens 16. The position of the pin 39 and iris 34 is shown after such a movement in dotted lines. If it is desired to close the other iris the rings 37 and 38 are rotated back to normal position to first open iris 34 and then on past that point in a counter clockwise direction to cause pin 39 to bear against arm 42 and close iris 35. A spring 43 may be provided to open the irises when the pressure of pin 39 is removed from their respective arms 41 and 42 so that when pin 39 is in its normal or inoperative position, the irises will also be in retracted position with the lenses wide open. Thus, it will be seen that in operating a camera equipped with our invention it becomes a simple matter to first determine the correct amount of exposure for each part image and secondly to see that this proper exposure is given to each film area. If a camera such as previously mentioned is being used where but one light splitting means is used for both the camera and the finder, the one pair of irises will obviously serve both to determine the correct exposure and to produce it on the film. If a separate finder is being used, the two sets of irises can be coordinated so that once the correct setting is determined in the finder, it can be quickly duplicated in the camera.

We have found that the best way to balance the exposures for individual lighting conditions, once the foregoing standardization has been effected, is to focus the camera and finder on a relatively white or other neutral object and to adjust the irises while looking through the finder until the object as viewed through the eyepiece appears in its natural color as apparent to the eye under the particular photographing conditions. If for instance a white wall is used as the basis of regulation, the irises are adjusted until the wall appears truly white in the eyepiece, even though this means increasing or decreasing the amount of light passing through one of the filters. As previously mentioned, it is known that the color of daylight varies with the position of the sun and with atmospheric conditions and the eye automatically corrects for this chromatic variation so that a white wall for instance appears white to the eye under practically all conditions. Photographic film however, does not have this corrective faculty and as the wave length of the photographing light changes, it becomes necessary to compensate for it by varying the relative exposures of the part images obtained, so that upon recombining them, they will give a correct composite color reproduction, and as previously explained, once the camera and finder have been correlated, the correct exposure is always made if the image appears in its correct colors in the eyepiece of the finder.

In some instances it will be found to be more desirable to utilize but a single lens in the light splitting portion of the finder, this particularly being the case where the finder is employed with a camera having a single lens light splitting optical system in which the camera box is racked from focusing position to exposure position. In Fig. 3 we have illustrated a novel type of directional beam splitter and single lens assembly for use in conjunction with the other features of our invention and by reference thereto it will be seen that but little change is necessitated in the general layout.

As before, we provide plus and minus lenses 12 and 11, a semi-reflecting semi-transparent surface 13 and a full reflecting surface 14 which in this case is preferably provided by a plate instead of a prism. Two component beams $a$ and $b$ are formed, but instead of the two lenses 16 and 17 we provide a single lens 43 preferably focused on infinity and arrange the angles of surfaces 13 and 14 so that each of the rays $a$ and $b$ pass through the lens 43 to be focused on a ground glass 18 provided with complementary filters 21 and 22 as before. Behind the ground glass 18 and preferably at right angles to the respective beam paths are lenses 25 and 26 through which beams $a$ and $b$ pass. Beam $a$ travels directly to the semi-transparent semi-reflective surface 27 as before and through it to lens 30 and eyepiece 31. Beam $b$ passes through a plate 28 and right angled prism 29 and is reflected by the latter on to the plate 27 where it is recombined with beam $a$ and passes through lens 30 and eyepiece 31. The adjustment and operation of this form of our invention is similar to that previously described in detail for the form of Fig. 1. Likewise film portions 19 and 20 with their corresponding filters 23 and 24 may be provided as in the former case. With this type of finder it is essential to have the auxiliary compensating lenses in front of the light splitter for the single objective lens must be locked in position and cannot be moved for focusing.

In Fig. 3 we have shown a modified form of color balance control which is particularly applicable to the single lens type of finder and camera although as will be apparent to those skilled in the art it can be interchangeably used with the iris mechanism illustrated in Fig. 2. This control means comprises a simple color wedge in which the change in color can be gradual as illustrated or can be in definite steps. The wedge indicated by the numeral 44 can be made up in different colors and each wedge varies in density from one end to the other.

Wedges 44 and 45 of different colors are inserted in the light paths $a$ and $b$ of Fig. 3 immediately behind the light splitting means, their colors preferably being duplicates of the colors of filters 21 and 22 respectively. By varying the position of the individual wedges with respect to the light paths $a$ and $b$, varying amounts of light of their respective spectral ranges are allowed to pass through the lens 43.

It will be understood of course that a plurality of separate filters of various densities could be used in place of the wedges if desired, although in the interest of simplicity we find it desirable to employ a wedge as described.

The optical system of our finder has numerous other uses besides the conventional ones previously described. For instance when the separate color value images are recorded on separate portions of the same film or on different films our apparatus provides a satisfactory and simple means for checking the respective color balances of the two developed images without the necessity of coloring them. The two developed but uncolored images are merely projected on a screen in normal manner by any usual projector and are viewed through the recombining portion 32 of our finder with the ground glass removed. The filters 21 and 22 are chosen to substantially duplicate the colors produced by the color process used in making the final colored prints for projection. The recombining portion 32 has a long focal distance and the plate 28 can therefore be easily adjusted to make the center distance of the finder coincide with that of the pictures on the screen. By this operation one is enabled to visually recombine in color the two uncolored images appearing on the projection screen so that the viewer can tell if the images have the correct density to reproduce the picture in its proper colors when finally processed.

This inspection of uncolored images on the screen may also be accomplished by a simplified form of our apparatus, consisting merely of the filters 21 and 22 and the recombining surfaces 27 and 29 and plate 28, omitting the lenses 25 and 26 and the eyepiece 31. The images are of course already magnified by projection on the screen and satisfactory results can be obtained by merely adjusting the recombining surfaces with respect to the screen and the eye so that the two enlarged images on the screen are recombined in registry on the surface 27 where they are viewed direct. By employing the proper filters 21 and 22 this resulting image gives a correct interpretation of the ultimate image in color. It will be apparent that such an apparatus without lenses can be made very cheaply and has many uses in commercial color photography, and particularly for viewing "rushes" or dairy prints.

According to the process used in coloring the pictures produced, it may become advisable to make several test prints of the negatives, the various prints being of different density. The usual procedure in such a case is then to color up these test strips (called cinex strips in the art) and to pick the required ultimate density of the positive part images by matching up the two strips.

By using our modified apparatus as just described these varying density test strips may remain uncolored and projected upon a screen, and by viewing them in recombined relationship through our device provided with appropriate filters the correct density of the respective images can be picked immediately, thus having a laborious and lengthy step in the ultimate processing.

The optical system of our invention can also by a slight modification be utilized for making copies from negative or positive part images. In projecting additively, it is merely necessary of course to duplicate the separated images of the negative and then to color them or project through filters and a recombining optical system to superimpose them on the screen. However, in making prints for subtractive projection, it is necessary to superimpose or register the various part images in one film and then to separately color the respective images to give a resultant composite image in color. The steps of printing and coloring may be done alternately or not as desired, i. e. one negative part image is printed and the positive latent image developed and colored and then after resensitizing the film the second negative part image is printed, developed and colored or both images may be printed, developed together and subsequently colored. In all of these methods, however, the primary factor to be considered is the problem of registry, whether the printing be done by contact or optically.

Referring again to Fig. 1, it will be seen that in this modification of our invention, we utilize the recombining portion 32 of the optical system previously described. The ground glass 18 is removed however and a source of light 50 is placed in back of the filters 21 and 22 which are preferably red and blue for the ordinary positive stock now on the market which is blue sensitive only. A separate lens assembly 51 is placed opposite the semi-reflecting surface 27 and in optical alignment therewith and light sensitive film 52 is disposed behind the lens 51 and adapted to be moved across the optical path of said lens by means not shown. The developed negative film or films with the recorded part images 19 and 20 is placed either immediately in front or in back of the filters 21 and 22 and is adapted to be moved in synchronism with the film 52 by means not shown.

The operation of printing the two images 19 and 20 on to the light sensitive film 52 in superposed relationship is as follows. The blue filter is placed in front of the first image to be printed and the red filter before the other image and the light source 50 is turned on. Assuming that the image to be printed is in the light path *a* and the filter 21 is blue, a positive blue reproduction of image 19 will be focused directly upon semi-reflective surface 27 and will be partially reflected thereby to lens 51 and recorded on film 52 which is as mentioned blue sensitive, but insensitive to red. The balance of the beam *a* will of course pass through surface 27 and be visible in the eyepiece 31. If motion picture film is being printed, the two films i. e., the positive raw stock 52 and the negative bearing image portions 19 and 20 are advanced in synchronism either continuously or intermittently as desired and all of the negative images 19 are printed onto the positive film strip 52. After the series of images 19 has been printed, the film may be developed, colored and resensitized or the second images 20 may be printed immediately to the balance of the emulsion layer, the particular order of steps forming no part of our invention. However, at some stage of the proceedings it becomes necessary to print the series of images 20 in registry with the series of images 19 first printed.

To perform the second printing operation the films are again placed in the light paths as before, but the filters 21 and 22 are reversed so that the images 20 are now illuminated with blue light to which the film 52 is sensitive and the images 19 are illuminated with red light to which the film 52 is insensitive. The light source 51 is turned on and the film strips are moved in synchronism as before, care being taken of course that their positions exactly coincide with their previous positions so that the same images 19 and 20 are in register with the previously printed images 19. The image 20 formed by beam *b* will proceed through plate 28 and prism 29 to impinge on semi-transparent surface 27, part of it passing on through to lens 51 to be recorded on film 52 in superimposition with the previously printed image 19. The red and blue images 19 and 20 will of course be combined on surface 27 and will be visible in the eyepiece as a composite picture in substantially correct color. By viewing the combined images through the eyepiece it can be readily ascertained whether they are in registry, for if they are not, a color fringe will be at once apparent. If the images are in perfect registry on the surface 27 as viewed by eyepiece 31, they will of course be in registry on film 52 and a continuous check is therefore available during the printing of the second image. If during the second printing operation the images are seen to go out of register, the plate 28 can be immediately rotated until the color fringe appearing in the eyepiece is entirely removed which indicates that the images being printed are once again in register.

It is to be understood of course that the exact colors of the filters may be varied depending on the sensitiveness of the raw stock and surrounding conditions. In printing the first image, white light may be used if it is entirely masked off from the image not being printed. Likewise, in printing the second image white light can be used instead of blue light so long as the light passing through the other image is of a wave length not recorded by the film 52. In this case however the composite image seen in the eyepiece will of course be made up of one color and white. If film of a different color sensitivity from that now in current use is employed, the colors of the filters would of course be altered. Likewise either of the images 19 or 20 may be printed first, the order depending generally upon the color process being used.

While the forms of our invention shown and described herein are now deemed the preferred forms and are fully capable of attaining the objects and providing the advantages herein mentioned, it is to be understood that they are merely illustrative of the broad principle involved in our invention as defined by the appended claims.

We claim as our invention:

1. A camera of the character described which includes: compensating lens means; means for dividing the light emerging from said lens into two component beams of the same field; stationary objective lens means in said beam paths; substantially complementary filters in said component beam paths; a diffusion screen and lens means in said component beam paths; means behind said screen for recombining said component colored beams after they pass through said screen; said means including a semi-reflective, semi-transparent surface, a reflective surface and a movable plate adapted to be adjusted to effect exact recombination of said beams on said semi-reflective surface; and means for viewing said recombined color beams.

2. A motion picture camera which includes: lens means; means for dividing the light emerging from said lens means into two beams; means for focusing said beams upon adjacent areas of film; substantially complementary filters in said component beam paths; means for removing said film areas from said light paths and substituting a diffusion screen in place thereof, means adapted to recombine the two images produced by said beams upon said diffusion screen; and means behind said diffusion screen for viewing said recombined images as a composite image.

3. A motion picture camera which includes: lens means; means for dividing the light emerging from said lens means into two beams; means for focusing said beams upon adjacent areas of film; means for independently varying the quantity of light in each of said component beams; substantially complementary filters in said component beam paths; means for replacing said film areas in said light paths with a diffusion screen, means behind said diffusion screen adapted to recombine the two images produced by said beams upon said diffusion screen; and means for viewing said recombined images as a composite image.

4. A camera of the character described which includes: compensating lens means; means for dividing the light emerging from said lens means into two component beams of the same field; objective lens means in said beam paths; a diffusing screen removably disposed in the same plane as a film when the latter is in exposure position; lens means in said component beam paths for focusing on said screen; means behind said screen for recombining said component beams after they pass through said screen, said means including a semi-reflective, semi-transparent surface, a reflective surface, and a movable plate adapted to be adjusted to effect exact recombination of said beams on said semi-reflective surface; and means for viewing said recombined beams.

5. A camera of the character described which includes: compensating lens means; means for dividing the light emerging from said lens means into two component beams of the same field; objective lens means in said beam paths; a diffusing screen removably disposed in the same plane as a film when the latter is in exposure position; lens means in said component beam paths for focusing on said screen; means behind said screen for recombining said component beams after they pass through said screen and including adjustable means in at least one beam path to effect exact recombination of said beams; and means for viewing said recombined beams.

6. A motion picture camera which includes: lens means; means for dividing the light emerging from said lens means into two beams; means for focusing said beams upon adjacent areas of film; means for removing said film areas from said light paths and substituting a diffusion screen in place thereof; means behind said diffusion screen adapted to recombine the two images produced by said beams upon said diffusion screen; and means for viewing said recombined images as a composite image.

7. A motion picture camera which includes: lens means; means for dividing the light emerging from said lens means into two beams; means for focusing said beams upon adjacent areas of film; means for independently varying the quantity of light in each of said component beams; means for replacing said film areas in said light paths with a diffusion screen; means behind said diffusion screen adapted to recombine the two images produced by said beams upon said diffusion screen; and means for viewing said recombined images as a composite image.

WILLIAM H. HARRISON.
EDWARD C. HARRISON.